Oct. 26, 1965  G. B. HORTON  3,214,212
WINDOW STRUCTURE
Filed Sept. 20, 1962
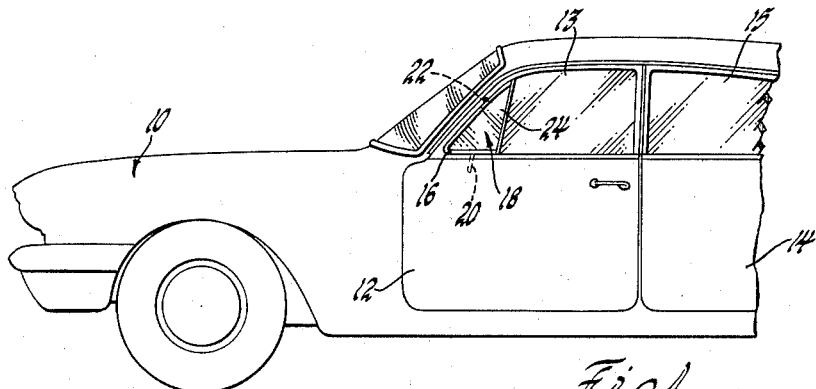
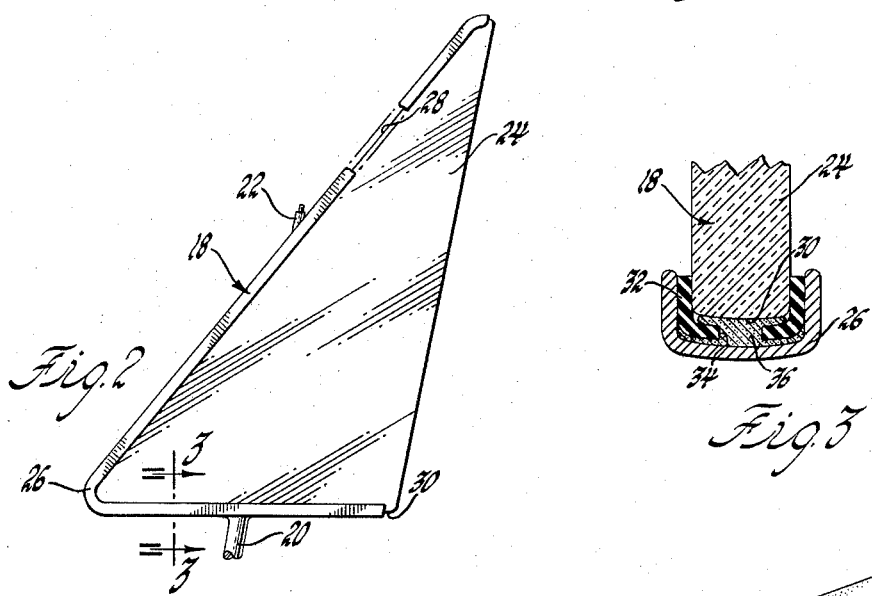
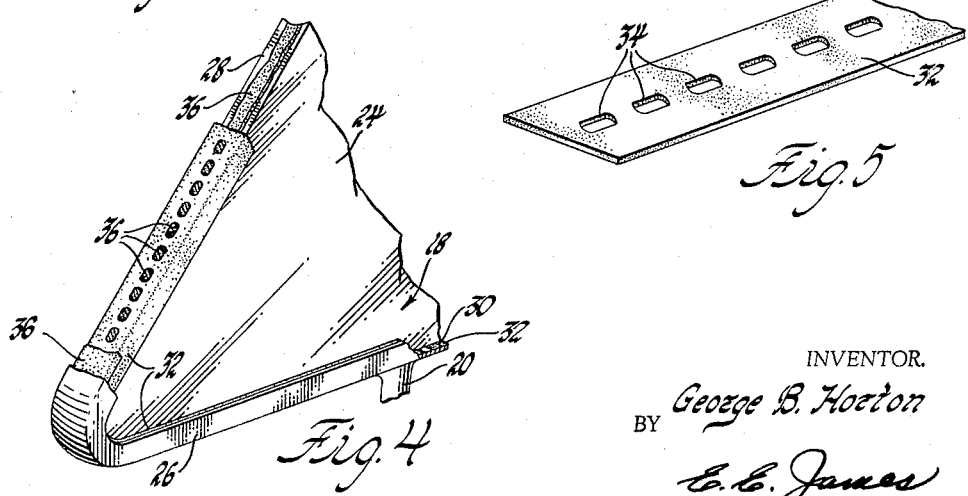
INVENTOR.
George B. Horton
BY
E. E. James
ATTORNEY

United States Patent Office

3,214,212
Patented Oct. 26, 1965

3,214,212
WINDOW STRUCTURE
George Bruce Horton, Dearborn, Mich., assignor to General Motors Corporation, Detroit, Mich., a corporation of Delaware
Filed Sept. 20, 1962, Ser. No. 225,102
2 Claims. (Cl. 296—44)

This invention relates generally to window structures and more particularly to the mounting of a window within a supporting frame. With regard to certain more specific aspects, the invention has particular utility in a pivotal ventilating window assembly for a motor vehicle or the like and is herein shown and described in such an environment for illustrative purposes. The invention is not so restricted, however, being applicable to framed window structures generally.

In vehicle ventilating windows of the type indicated, the edge of the glass is usually covered with a glass insulating filler tape of suitable resilient sealing material and subsequently pressed into a metal frame member of channeled cross section. The glass is thus clamped and generally retained within its mounting frame by the resilient frictional engagement effected between the tape and the opposing side faces of the glass and frame. To provide the necessary clamping forces and glass retaining frictionally engaged surfaces, the channel frame must be of substantially heavier gauge and of greater side wall depth than that required to pivotally mount and aesthetically frame the window glass. Such a heavier, deeper channel member is of course more expensive and more difficult to properly form. A wider and therefore more expensive tape is also required by such previous constructions.

In past constructions, the filler tape has been sometimes bonded to the edge of the glass and a bead of cement placed in the channel frame before assembly to thereby bond the filler tape within the channel frame. However, any excess cement squeezed out over the upper edges of the tape and channel necessarily has to be removed as an additional final step in any such assembly. Although desirable, bonding of the frame directly to the glass has not been possible since the filler tape separates these two members. In certain applications, pressure or heat sensitive filler tapes have been used for such frame-to-window bonding purposes. The production use of such bonding tapes has generally been unsatisfactory and expensive, however, due to their dirt attracting characteristics and the necessary application of pressure or heat to the framed window as a final step in assembly.

The instant invention contemplates the use of a glass insulating filler tape of resilient material having a plurality of spaced perforations opening on the engaged edges of the glass. These perforations permit a cement bead placed in the channel frame to bond not only the filler tape but also the edge of the window glass directly to the channel member. During assembly, the cement applied to the channel is extruded through the spaced perforations of the tape to provide a direct bond between the channel and the glass. Any "excess" cement is sealed between the channeled frame and glass and used to increase the area and thus the strength of the bonding joint. The invention thus avoids any overflow of cement onto the glass outside the frame. Since glass-to-frame retention is accomplished by the cement instead of lateral pressure exerted by relatively high channel side walls, a relatively shallow, more decorative and substantially more economical channeled frame may be used.

The foregoing and other objects, advantages and features of the invention will be apparent from the following description of the illustrative embodiment having reference to the accompanying drawing in which:

FIGURE 1 is a side elevational view of a portion of an automotive vehicle body having a door mounted ventilating window illustrative of the invention;

FIGURE 2 is an enlarged view of the ventilating window shown in FIGURE 1;

FIGURE 3 is an enlarged fragmentary sectional view of the ventilating window taken substantially in the direction of the arrows and in the plane of the line indicated at 3—3 of FIGURE 2;

FIGURE 4 is a fragmentary perspective view of the illustrative window assembly with portions broken away to show the cement-bonded mounting of the window glass within the channel of the frame member through the resilient perforated filler tape in accordance with the invention; and FIGURE 5 is a fragmentary perspective view showing a portion of the perforated filler tape of the invention prior to assembly.

Referring more particularly to FIGURE 1, the body of an automotive vehicle is generally identified by the reference numeral 10. Front and rear doors 12 and 14 mount retractable windows 13 and 15, respectively, and provide access to the passenger compartment of the vehicle in a conventional manner. In addition to the window opening closable by the retractable window 13, the upper portion of the front door 12 is provided with a forward window opening 16. This opening is preferably outlined by conventional sealing means, not shown, engageable wtih the periphery of a ventilating window assembly 18 mounted at 20 and 22 for pivotal opening and closing movement with respect to the door opening 16.

The ventilating window assembly 18 includes a panel or pane 24 of laminated or tempered safety glass shaped to conform to the window opening 16. As shown in FIGURES 2, 3 and 4, this pane is mounted within a frame member 26 of relatively shallow channeled cross section. Pivot posts 20 and 22 are coaxially secured to the outer walls of the frame member on opposite sides of the glass pane and serve to pivotally mount the assembled window with respect to the window opening of the door. The frame 26 is channeled and formed to receive and spacedly embrace the upper forward and bottom edges 28 and 30 of the ventilating window pane. A glass insulating filler tape 32 is compressively interposed in assembly between the side and bottom walls of the shallow channel of the frame member 26 and the adjacent opposing surfaces or edges of the window glass. This filler tape is preferably made of a suitable fiber reinforced resilient material.

In accordance with the invention and as best seen in FIGURES 3, 4 and 5, the filler tape 32 is provided with a plurality of spaced perforations 34 opening on the mating edges of the glass. During assembly, a bead of cement 36 applied to the inner bottom wall of the frame member is forced or extruded through the spaced perforations of the tape to provide a direct bond between the adjacent edge of the glass, the tape and the frame member. The cement 36 preferably has elastomeric bonding properties. All of the supplied cement is sealed and retained by the compressive sealing action of the tape between the glass and side walls of the frame. Hence, any supplied "excess" of cement is compressively forced between the mating surfaces of the tape, frame and glass and increases the effective area and strength of the bonding joint. Overflow and subsequent cleaning of an "excess" cement during assembly is thus avoided.

Since glass-to-frame retention is primarily and directly accomplished by the cemented perforated tape joint of the invention, the window supporting channel frame may be substantially shallower and of somewhat lighter gauge than that normally used for such vehicle ventilating windows wherein glass retention is usually accomplished by lateral pressures exerted by relatively high channel side walls. The lighter shallower frame member permitted by the invention is generally more decorative and pleasing, provides maximum unobstructed glass area, and is substantially easier and less expensive to form. In contrast to conventional vehicle ventilating windows, the illustrative window is more easily and economically manufactured and capable of quick glass replacement without requiring removal of the window frame from the vehicle and the use of special glass installing equipment.

From the foregoing description of the illustrative embodiment, it will be seen that the invention provides a relatively simple means for accomplishing the several contemplated advantages and objectives of the invention. It will be further apparent that the invention is also applicable to other framed window constructions and that various departures, changes and modifications might be made in and from the illustrative embodiment without departing from the spirit and scope of the invention as defined in the following claims.

I claim:

1. A window assembly for a motor vehicle having a window opening therein, said assembly comprising a glass pane formed to substantially close said vehicle window opening, a framing member of shallow channeled cross section having side and bottom walls formed spacedly receive at least one edge of said glass pane, means for mounting said framing member for window opening and closing movement with respect to said window opening, a glass insulating member of resilient material having side portions and a bottom portion, said side portions of said material being compressively and sealingly interposed between the side walls of said framing member and said glass pane, said bottom portion of said insulating member being interposed between said bottom walls of said framing member and said edge of said glass pane and having a plurality of spaced perforations opening therethrough, and an elastomeric cement extending through said perforations and bonding said edge of said glass pane to the bottom walls of said framing member, said side portions of said resilient material preventing the extrusion of cement between the side walls of said framing member and said pane, whereby any excess of cement is retained between the bottom walls of said framing member and the edge of said glass pane.

2. A window assembly comprising a glass window pane, a frame member having side and bottom walls, glass insulating means including a member of resilient material having side portions and an intermediate portion, said side portions being interposed between and sealing said frame member with respect to opposite side surfaces of an adjacent edge of said window pane, said intermediate portion of said glass insulating member having a plurality of spaced perforations extending therethrough, and an elastomeric cement extending through said spaced perforations and bonding said adjacent edge of said window pane to said bottom walls of said frame member, said side portions of said resilient material preventing the extrusion of cement between the side walls of said frame member and the side surfaces of said pane, whereby any excess of cement is retained between the bottom walls of said framing member and said edge of said glass pane.

References Cited by the Examiner
UNITED STATES PATENTS

| 255,168 | 3/82 | Helfrish | 161—115 X |
| 1,482,908 | 2/24 | Bunker | 161—114 |
| 2,692,792 | 10/54 | Walker | 296—44 |
| 3,037,810 | 6/62 | Kelley | 20—56.4 |
| 3,061,895 | 11/62 | Kleinhans | 20—65 |

FOREIGN PATENTS 967,950  4/50  France.

MILTON BUCHLER, *Primary Examiner.*

PHILIP ARNOLD, A. HARRY LEVY, *Examiners.*